United States Patent [19]

Bush

[11] Patent Number: 4,464,347

[45] Date of Patent: Aug. 7, 1984

[54] RECOVERY OF ALUMINUM FROM SPENT LIQUOR

[75] Inventor: J. Finley Bush, New Kensington, Pa.

[73] Assignee: Aluminum Company of America, Pittsburgh, Pa.

[21] Appl. No.: 453,353

[22] Filed: Dec. 27, 1982

[51] Int. Cl.³ .......................... C01F 7/06; C01D 1/34
[52] U.S. Cl. .................................. 423/112; 423/121;
423/122; 423/127; 423/130; 423/181; 423/185;
423/186
[58] Field of Search ............... 423/112, 121, 130, 181,
423/127

[56] References Cited

U.S. PATENT DOCUMENTS

| | | | |
|---|---|---|---|
| 2,806,766 | 9/1957 | Anderson | 423/129 |
| 3,511,606 | 5/1970 | Halff et al. | 23/184 |
| 4,172,879 | 10/1979 | Miller et al. | 423/112 |
| 4,275,042 | 6/1981 | Lever | 423/130 |

FOREIGN PATENT DOCUMENTS 1123184 8/1968 United Kingdom ................ 423/122

OTHER PUBLICATIONS

Modification to Bauxite Digestion," *Proceedings of the Second International Symposium of ICSOBA*, vol. 1, pp. 43–57, (1970).

Primary Examiner—Herbert T. Carter
Attorney, Agent, or Firm—Andrew Alexander; John P. Taylor

[57] ABSTRACT

In accordance with the invention, spent liquor from an alumina precipitation stage is contacted with an extraction fluid to separate the mixture into a first layer comprising the extraction fluid and at least a portion of the caustic from the spent liquor and a second layer which comprises the remainder of the spent liquor. The spent liquor may then be subjected to a further precipitation to recover further alumina. The spent liquor remaining may be further treated in subsequent extraction steps to concentrate and dispose of undesirable impurities remaining.

7 Claims, 2 Drawing Figures

4,464,347

RECOVERY OF ALUMINUM FROM SPENT LIQUOR

BACKGROUND OF THE INVENTION

This invention relates to refining of ore containing aluminum compounds. More particularly, this invention relates to improving the yield in a Bayer process by processing of the spent liquor.

Ores containing aluminum compounds, more particularly bauxite type ores, are conventionally digested in caustic by the well-known Bayer Process to form a solution of sodium aluminate and sodium hydroxide. The solid bauxite residue (red mud) is then separated from the solution by clarification and, after washing to remove as much caustic content as economically feasible, is discarded. Alumina is recovered by precipitation from this solution by first cooling the solution to supersaturation and then seeding with aluminum trihydroxide. The spent mother liquor is then recycled back to the digester, after an evaporation step, for reuse of the caustic therein and to preserve the alumina values remaining in the spent liquor after precipitation.

Unfortunately, however, such ores may contain or form many other soluble compounds such as sulfates, fluorides and carbonates which, due to their solubility, are not removed in the clarification step. These unwanted impurities can build up in concentration with repeated recycling of the spent liquor which can retard the recovery of alumina from solution, deposit scale on equipment (particularly heaters), reduce evaporation efficiencies, increase the required plant size (for given throughput) and operating costs due to the circulating liquor loads and increase the impurity level in the product. It would, therefore, be desirable to efficiently separate out such impurities from the Bayer liquor.

The yield of alumina in the precipitation step is further influenced by the ratio of alumina to caustic in the liquor. As the caustic level rises, due to depletion of alumina by precipitation, further precipitation of alumina is inhibited. This is sometimes overcome by neutralization of the sodium hydroxide, e.g. with sodium bicarbonate. However, this requires further reprocessing of the neutralized liquor to recover the soda for reuse in the digester.

If the caustic in the spent liquor could be selectively removed after the initial precipitation of alumina, the spent liquor stream could be reseeded and further alumina values could be precipitated from the spent liquor.

SUMMARY OF THE INVENTION

It is, therefore, an object of the invention to provide a treatment system for separating caustic from sodium aluminate.

It is another object of the invention to provide a system for treatment of spent liquor from a precipitation stage to remove caustic.

It is a further object of the invention to provide a system for the removal caustic from spent liquor which will raise the alumina/caustic ratio sufficiently to permit a second precipitation of alumina from the treated spent liquor.

It is yet another object of the invention to provide a system wherein impurities introduced into the digestion and precipitation system can be removed.

It is a still further object of the invention to provide a system for treating spent liquor to remove such impurities without contaminating the desired precipitate.

These and other objects of the invention will become apparent from reading the description of the invention and the accompanying drawings.

In accordance with the invention, spent liquor from an alumina precipitation stage is contacted with an extraction fluid to separate the mixture into a first layer comprising the extraction fluid and at least a portion of the caustic from the spent liquor and a second layer which comprises the remainder of the spent liquor. The spent liquor may then be subjected to a further precipitation to recover further alumina. The spent liquor remaining may be further treated in subsequent extraction steps to concentrate and dispose of undesirable impurities remaining.

DESCRIPTION OF THE INVENTION

Spent liquor from an alumina precipitation such as the precipitation of green liquor from the well-known Bayer Process contains both caustic and alumina values. The ratio of alumina to caustic, however, is too low to permit further recovery of the alumina values by further precipitation. In accordance with the invention, the spent liquor is contacted with an extraction fluid capable of selectively extracting caustic from the spent liquor.

The extraction fluid, in addition to its selectivity for the caustic values, must be immiscible in the spent liquor forming two layers which can be subsequently separated from one another. Furthermore, the extraction fluid must be chemically capable of withstanding the caustic conditions under elevated temperatures without decomposition or degradation.

In a preferred embodiment, the extraction fluid comprises an ethyl alcohol which may be substantially pure or have up to 10 vol.% of denaturing ingredients, such as methanol, benzene, or the like, or inorganic denaturing agents. It has been found that ethanol, unlike its nearest homologs, methanol and propyl alcohols, will, upon contact with spent liquor, extract caustic, leaving a separate liquid layer comprising the spent liquor having an alumina to caustic ratio approaching that of a green liquor, thus permitting a second precipitation to recover further alumina values from the treated liquor.

Figure 1:
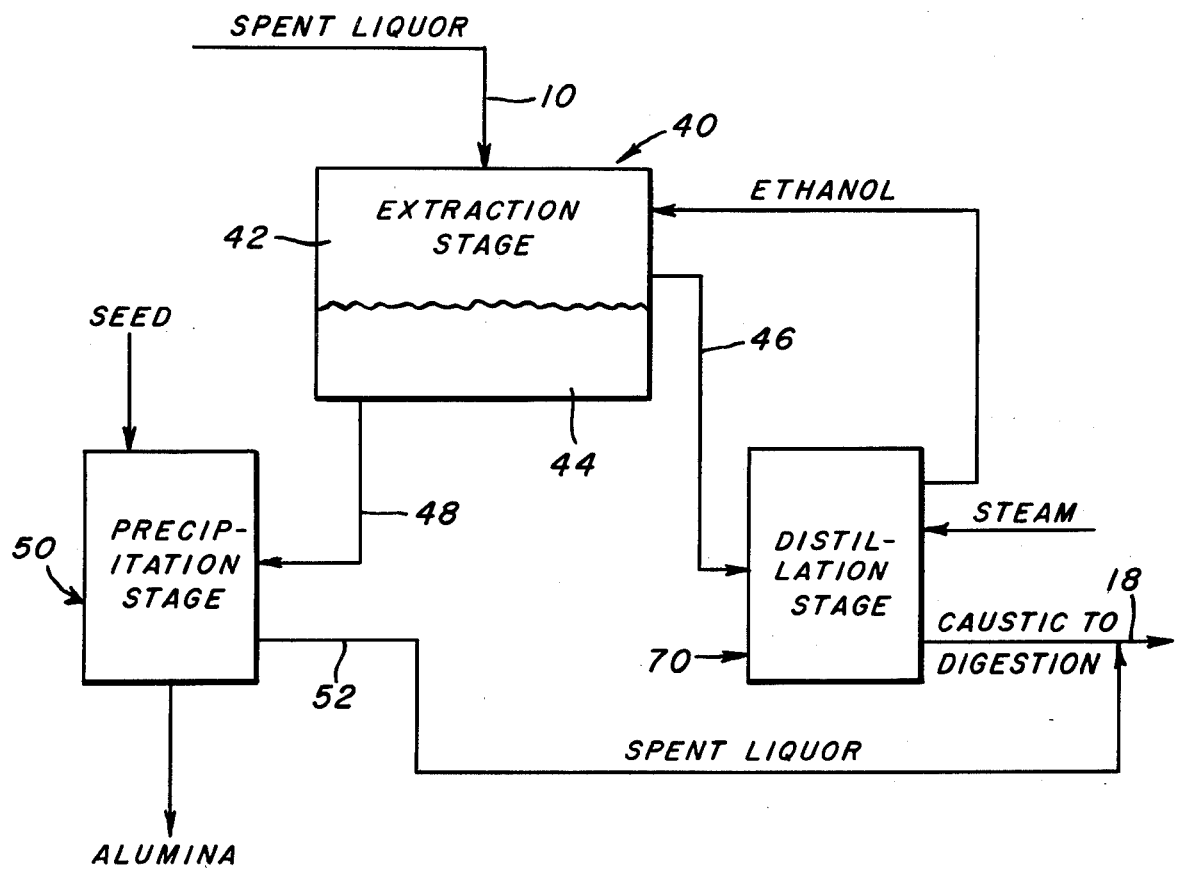
FIG. 1 is a flowsheet illustrating an elemental form of one embodiment of the invention.

Referring now to FIG. 1, the invention is illustrated in its most elemental form. A spent liquor stream 10 from a precipitation stage, such as a Bayer precipitation, is contacted at extraction stage 40 with an extraction fluid such as ethanol. The ethanol/caustic layer 42 is passed to distillation stage 70 via line 46, and the ethanol is separated from the caustic. The caustic is returned to the digestion plant via line 18 while the ethanol is recycled back to extraction stage 40.

The lower layer 44, which now comprises a sodium aluminate solution having an alumina/caustic ratio approaching a green liquor, is passed via line 48 to precipitation stage 50. The liquor stream is seeded with aluminum trihydroxide to form a precipitate of alumina. The precipitated alumina hydrate is then recovered and blended with alumina hydrate from the Bayer preciptiate while the resulting spent liquor stream 52 may be combined with caustic stream 18 for return to the digestor or recycled.

While the foregoing describes the extraction in its simplest form wherein additional alumina values can be precipitated for a given amount of digestion of ore, the invention finds its greater value in a multiple stage process wherein at least a portion of the spent liquor from the additional precipitation stage is further treated in subsequent extraction stages to remove other impurities in the system which may have been introduced via the ore and which, in any event, tend to build up in continuous recycling.

Figure 2:
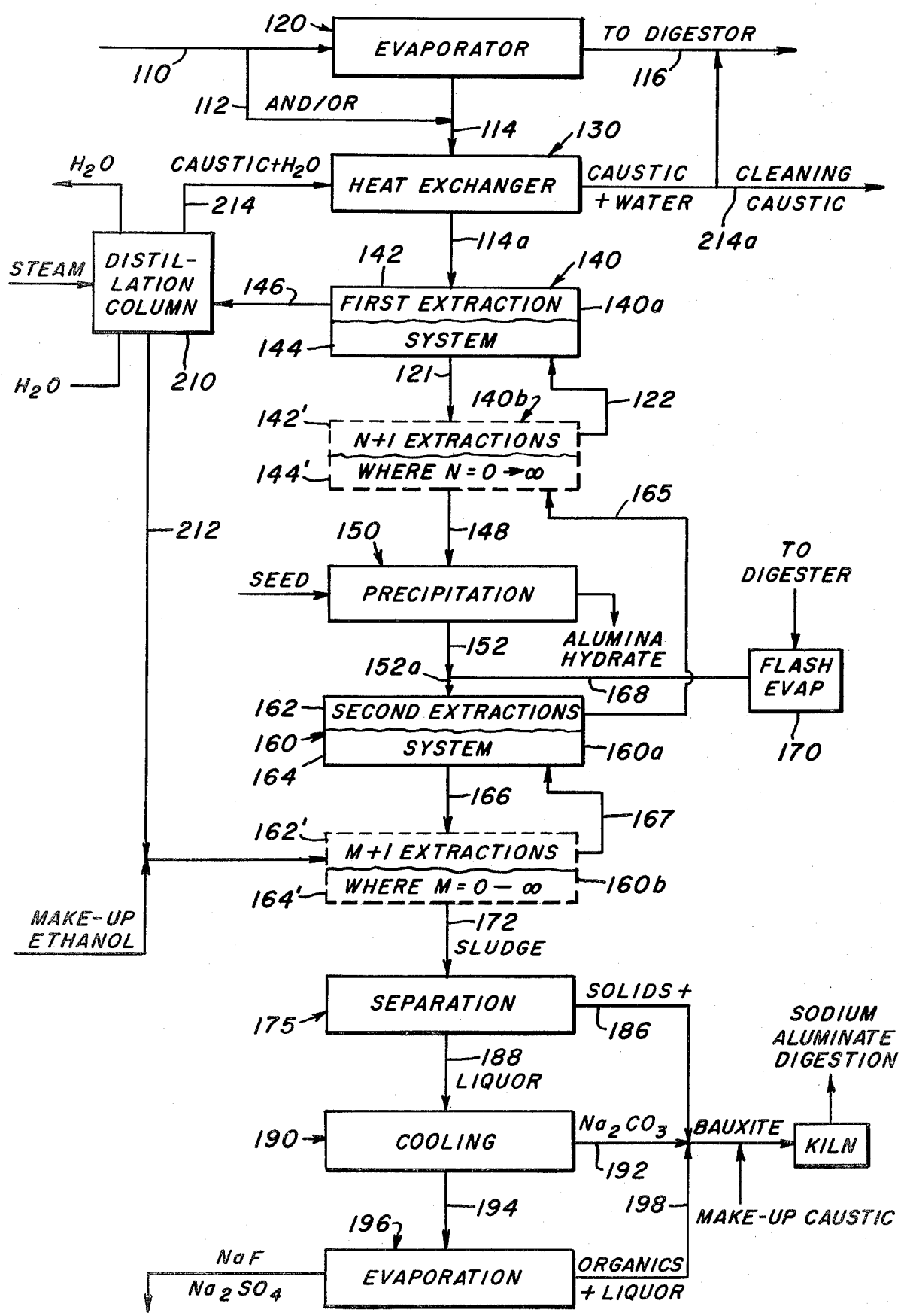
FIG. 2 is a flowsheet showing an expanded form of the process shown in FIG. 1.

Referring now to FIG. 2, a spent liquor stream 110 from a Bayer precipitation (not shown) may be optionally concentrated by evaporation by evaporator 120 or evaporator 120 may be bypassed in whole or in part by line 112. The concentrated spent liquor may then be split into two streams if only a portion of the spent liquor is to be subjected to the separation process of the invention. If the spent liquor is split into two streams, stream 116 may be returned directly to the digestion stage.

The main spent liquor stream 114 may be passed through heat exchanger 130 to heat output caustic stream 214 which has already been processed and is to be fed back to the digestion stage after blending with stream 116.

The cooled spent liquor stream 114a is then contacted with the extraction fluid in first extraction system 140 which, as illustrated in FIG. 2, may comprise two or more extraction stages with the first stage denoted as 140a and the additional stages denoted as 140b.

Most of the caustic values, i.e. NaOH or the like, combine with the extraction fluid into one layer 142. Layer 142, containing the extraction fluid and caustic, passes via stream 146 to distillation stage 210. The extraction fluid, if more volatile than the caustic (e.g., ethanol), is distilled off and passed to second extraction system 160 via line 212. The caustic residue stream 214 may be passed through heat exchanger 130 prior to blending with stream 116 for recycling back to the digester. A cleaning caustic side stream 214a may be tapped off stream 214 prior to combination with stream 116 for cleaning of equipment.

The remaining constituents in cooled spent liquor stream 114a, principally a sodium aluminate/caustic solution having an alumina/caustic ratio similar to green liquor and impurities, separate into another layer 144. Layer 144 is passed to the additional stage or stages 140b (noted in the drawing as n+1 extractions where n equal 0 to infinity) via line 120 where it is contacted with extraction fluid causing separation into layers 142' and 144'. Layer 142', which contains the extraction fluid and caustic, is cycled back to stage 140a via line 122. Layer 144' is passed to a precipitation stage 150 via stream 148 where the liquor is seeded with aluminum trihydroxide to precipitate alumina hydrate. The precipitated alumina may then be combined with the alumina precipitated from the Bayer Process.

In accordance with a second aspect of the invention, other impurities in the spent liquor are now separated out. Such impurities tended to build up in the conventional prior art process where the spent liquor from a Bayer precipitation is recycled directly back to the digestion stage. To accomplish this further separation, the spent liquor from the precipitation stage 150 is fed as a stream 152 to second extraction system 160. Stream 152 may optionally be separated into two streams 152a and 168. Stream 168 is flashed at 170 to remove any remaining separation fluid and the spent liquor is then returned to the digestion stage.

Spent liquor stream 152a is contacted in second extraction system 160 by extraction fluid from distillation stage 210 via stream 212. Extraction system 160 comprises two or more extraction stages with the first stage indicated as 160a and the additional stages being denoted as 160b. The fluids in stage 160a separate into layers 162 and 164. Layer 162 contains the caustic values and the extraction fluid while the remainder of the spent liquor, including dissolved impurities, separate into a second layer 164. The caustic/extraction fluid layer 162 may be recirculated back to first extraction system 140 via line 165.

Layer 164 is passed to the additional stage or stages 160b (noted in the drawing as m+1 where m equals 0 to infinity) via line 166 where it is contacted with fresh extraction fluid entering system 160 from distillation stage 210 via stream 212 as previously discussed. Two layers, 162' and 164', are formed. Layer 162', comprising the caustic and extraction fluid, is passed back to stage 160a by line 167.

Layer 164' ultimately forms a precipitate or sludge 172 consisting principally of sodium aluminate, particularly when second extraction system 160 comprises a multistage extraction. Liquor from system 160 and the sodium aluminate sludge or precipitation 172 are then removed and moved to separation stage 175. Liquor from stage 175 then passes through line 188 to cooling stage 190 where the liquid is cooled to 0° C. resulting in a sodium carbonate precipitate 192. The liquid in cooling stage 190 exits via line 194 and is then concentrated at evaporation stage 196, causing sodium sulfate and sodium fluoride to precipitate. These salts are then removed and either recovered or disposed of. The remaining fluid in line 198, containing principally caustic and organics, may be combined with the sodium carbonate in line 192 from cooling stage 190 and the solids in line 186 from separation stage 175 and recycled back to the kiln. There the organics may be burned off and the caustic and sodium carbonate may be reacted with fresh bauxite ore to recover the sodium values as sodium aluminate.

Distillation stage 210, which is used to recover the extraction fluid, preferably comprises at least two distillation columns in series. When the extraction fluid comprises ethanol, the feed to the second column will comprise about 70% ethanol and 30% water, and the second column will yield a top layer of about 95% ethanol and 5% water with the bottom layer of water containing only a trace of alcohol.

Thus, the invention provides an improved process for the recovery of alumina from ore wherein a second precipitation, after extraction of caustic from spent liquor, permits recovery of a greater yield of alumina from a given amount of green liquor from a digestion process. The invention further permits removal of undesired impurities from the digestion-precipitation loop, thus reducing scale buildup on equipment and downtime for cleanup as well as increasing the overall purity of the alumina product.

Having thus described the invention, what is claimed is:

1. An improved process for the recovery of alumina from ore containing aluminum compounds which previously has been subject to a Bayer type caustic digest wherein sulfate and fluoride impurities in the ore normally digested with the alumina and recycled back to the digestor in the spent liquor may be selectively removed comprising:

(a) contacting spent liquor from an alumina precipitation stage with ethyl alcohol to separate the mixture into a first layer comprising the ethyl alcohol and at least a portion of the caustic from the spent liquor and a second layer which comprises the remainder of the spent liquor;

(b) subjecting said second layer to a second precipitation to remove further alumina values;

(c) treating at least a portion of the spent liquor from said second precipitation to remove said sulfate and fluoride impurities said treating including contacting said portion of spent liquor from said second precipitation with ethyl alcohol; and (d) recycling said purified spent liquor back to said ore digestion.

2. The process of claim 1 wherein said ethyl alcohol used to treat said spent liquor from said second precipitation comprises ethyl alcohol recovered from separating the caustic in said first layer from said ethyl alcohol initially used to treat spent liquor from the first precipitation.

3. The process of claim 1 wherein said further treatment of spent liquor with ethyl alcohol results in the formation of a sodium aluminate sludge which is separated from the remaining spent liquor solution.

4. The process of claim 3 wherein said solution also containing sodium carbonate and, after separation from said sodium aluminate sludge, is cooled to form a sodium carbonate precipitate which is then removed from said solution.

5. The process of claim 4 wherein said solution, after removal of said sodium carbonate precipitate, is evaporated to form a precipitate comprising sodium fluoride and sodium sulfate.

6. The process of claim 5 wherein said solution, after precipitation of said sodium fluoride and sodium sulfate, is separated from said salts and recycled back to the digestion of ore.

7. The process of claim 6 wherein said solution is recombined with said sodium carbonate prior to recycling back to the digestion of ore.

* * * * *